(12) United States Patent
Wilson et al.

(10) Patent No.: US 7,931,364 B1
(45) Date of Patent: Apr. 26, 2011

(54) OPTICAL PRESCRIPTION INSERT CARRIER

(76) Inventors: Murray Kendall Wilson, Yuma, AZ (US); William J Wood, Fort Collins, CO (US)

( * ) Notice: Subject to any disclaimer, the term of this patent is extended or adjusted under 35 U.S.C. 154(b) by 0 days.

(21) Appl. No.: 12/730,227

(22) Filed: Mar. 23, 2010

Related U.S. Application Data

(60) Provisional application No. 61/214,518, filed on Apr. 24, 2009.

(51) Int. Cl.
*G02C 9/00* (2006.01)
(52) U.S. Cl. .......................................... 351/47; 351/57
(58) Field of Classification Search .................... 351/47, 351/48, 57, 58, 44, 41, 158; 2/13
See application file for complete search history.

(56) References Cited

U.S. PATENT DOCUMENTS

| | | | | |
|---|---|---|---|---|
| 1,310,077 A | * | 7/1919 | Heaford | 351/47 |
| 2,901,752 A | * | 9/1959 | Granger | 2/13 |
| 5,428,407 A | * | 6/1995 | Sheffield | 351/58 |
| 5,929,963 A | * | 7/1999 | McNeal | 351/47 |
| 6,244,705 B1 | * | 6/2001 | Ledbetter et al. | 351/57 |
| 7,029,114 B2 | * | 4/2006 | Smith | 351/47 |

* cited by examiner

*Primary Examiner* — Hung X Dang

(57) ABSTRACT

An optical insert carrier that may retain a left and right lens having at least two opening holes. The optical insert carrier maybe attached to the back side of a pair of sunglasses having a right and left lens, wherein the back side is the side of the sunglasses that faces the wearer. The optical insert carrier is made from thin sheet or molded material in the range of 0.010 to 0.060 thickness.

4 Claims, 4 Drawing Sheets

OPTICAL PRESCRIPTION INSERT CARRIER

CROSS-REFERENCES TO RELATED APPLICATIONS

This application claims priority from U.S. Provisional Application Ser. No. 61/214,518 filed Apr. 24, 2009, which is hereby incorporated herein by reference in its entirety.

TECHNICAL FIELD

The present invention relates to an optical carrier that holds prescription lenses behind a sunglass frame that has a left and right lens. The said optical carrier is made of thin material and may be formed substantially similar to the sunglass frame.

BACKGROUND OF THE INVENTION

Sunglasses and prescription sunglasses have been around for many years. Sunglasses are generally used for outdoors to protect your eyes from all elements such as ultraviolent radiation. Prescription sunglasses are used to help people correct their vision while being outdoors.

In today's market with new technology sunglasses have been designed to wrap more, offering coverage in a wider peripheral view. Lens manufactures were able to design sunglasses having what is called an 8 or 9 base curve to wrap closer to the eyes and offer wider viewing area. Sunglasses using this type of technology only need a lens to be 1.5 millimeters thick or more to correct for prismatic power. When offering a sunglass with corrective lens power, it is more difficult to create a prescription that will fit into an 8 base curve frame design. Generally a person that needs to see close up will require a lens to be thick in the middle and thin on the edge. A person who can't see distance will require a lens to be thin in the middle and thick on the edge. This creates problems for mounting and cannot be achieved with every patient needing corrected lenses.

Lens manufactures have been able to improve the process of making corrective lenses by using alternative materials to reduce thickness problems. However certain materials don't offer impact resistance such as CR39, an acrylic based material. This material has high abbe values but low resistance to impact, which can be hazard to someone wearing sunglasses outdoors. Other materials such as Trivex uses polyurethane which improves impact, but doesn't meet all requirements. The best material known to impact but low abbe value is polycarbonate. This material is not always available for a patients prescription.

The sunglass industry came out with wraparound sunglasses as far dated back to the 1940's. Many companies have come up with ways to put an insert into an existing sunglass frame that wraps. There is lots of products on the market that offer bulky inserts that can be seen from the front and are unattractive.

The current invention provides a unique optical carrier that hides the insert behind the sunglass frame. The thin material is held in place by tension on the left and right side and nose bridge. The insert is light weight, safe to wear during athletic activity and can fit a high range of prescriptions.

BRIEF SUMMARY OF EMBODIMENTS OF THE INVENTION

The present invention allows a patient a wide range of prescription lens options for wrap around 8 or 9 base sunglasses. A patient needing corrective lenses may need a plus six or a minus six and is not limited. Most optical dealers such as "Lens Crafters" will not offer a patient a prescription that uses a frame with 8 or 9 base curve. The common answer is the frame has too much wrap and the patient is forced to go with a 4 base or 6 base curve. The lower the base number, the less wrap the lens will offer. When sunglass lenses first came out in the 1400's they were all pretty much 0 base curve, almost as flat as window glass.

In the late 1980's Oakley Inc. came out with a wrap around shield sunglass called the M Frame. It used a toric curve lens with a 6 base wrap horizontal and 4 base vertical curve. This was one of the first single shield sunglasses to offer a prescription in a wrap around. This concept took the toric lens and cut two hole openings and inserted corrected lenses. This was a clean design, but on lookers could see that the glasses were prescription due to the lines around the lens.

In 1990 the prior art U.S. Pat. No. 5,007,727 has a prescription insert that was used in a 6 base single sunglass lens shield design, with corrective lenses glued to a top mount. Other products on the market such as Bolle U.S. Pat. No. 5,412,438 uses an insert that is attached only at the nose but is designed to work with 6 a base sunglass design. All the optical inserts from the prior art use a single piece sunglass lens, similar to a ski goggle. RX inserts have been available for goggles for many years and were available for goggle looking single lens sunglasses in the 1980's.

The new improved insert is made from thin material that is light weight and is substantially similar to the backside of the sunglass frame. This gives the appearance of almost stealth look, but allowing the patient use 8 or 9 base wraparound sunglasses. The thin carrier material holds any lens that is 1 mm or thicker and retains it under pressure. Some inserts can fall out or move under pressure or impact.

The carrier is held in place by tension using a 3 point touch, being left, right and center. The center is held in place by the nose piece and the outer is retained under tension. The carrier rest up against the backside of the sunglasses giving it support under extreme conditions.

The prescription corrective lenses are cut with a reverse bevel meaning they have a v groove shape or u channel. The two holes in the carrier are used for the prescription lenses. A V or U groove is cut into the lens as wide as the carrier material, which creates a lock. The lens is also cut slightly larger than the hole to create tension. The type of bevel used is called a rimless. The rimless bevel gets its name from a frame that uses a wire or string to hold the lens in place. That type of bevel will hold the string or wire in place, the same way the thin carrier fits into the groove.

The bevel is generally put in the front edge of the lens, so that when the insert carrier is put close to frame, it doesn't make a gap. If the bevel was put into the back of the lens, the carrier would be further from the sunglass frame. One thing that separates this invention from others is that customers don't like bulky inserts and this eliminates that problem using the thin material.

The carrier can also be equipped with closed cell foam or fleece fabric to help block wind from users eyes. Foam is attached to the carrier with adhesive, and is not removable from the carrier. The carrier can also have additional holes to allow hinge cut outs.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
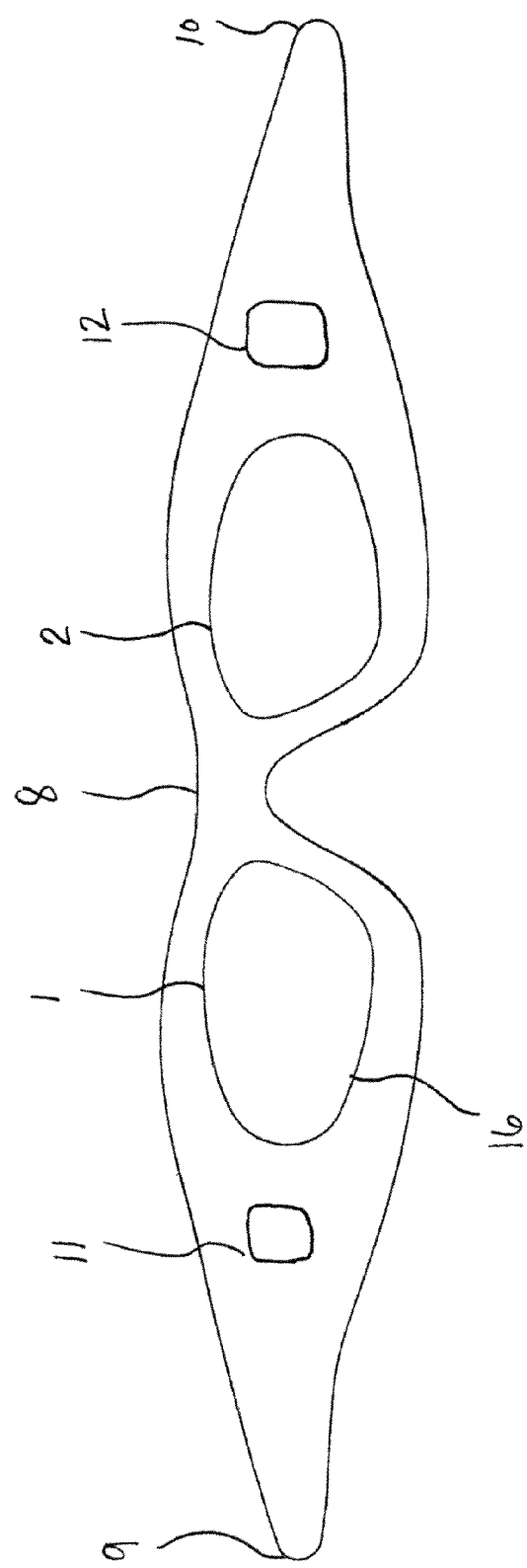
FIG. 1 is a plan view of the optical carrier.
Figure 2:
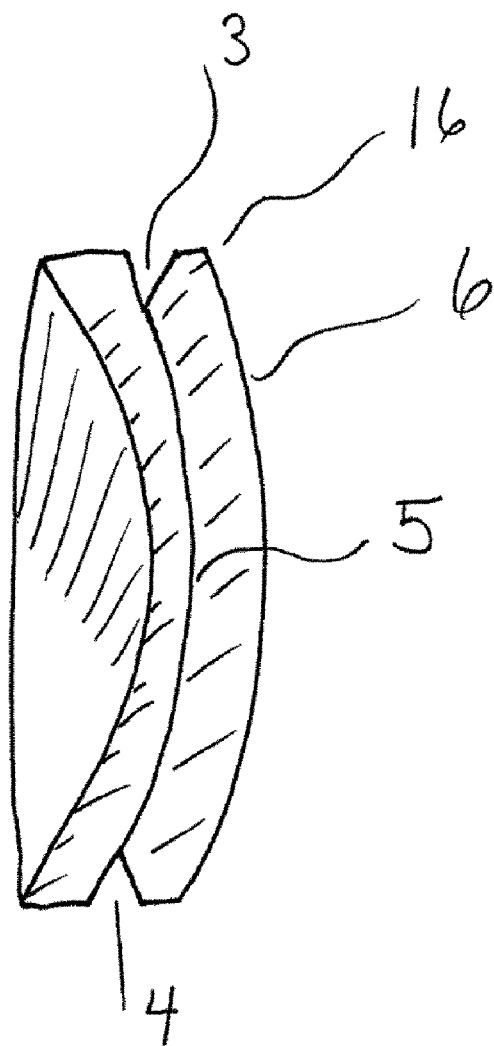
FIG. 2 is a cross section of a prescription lens detailing rimless v groove.
Figure 3:
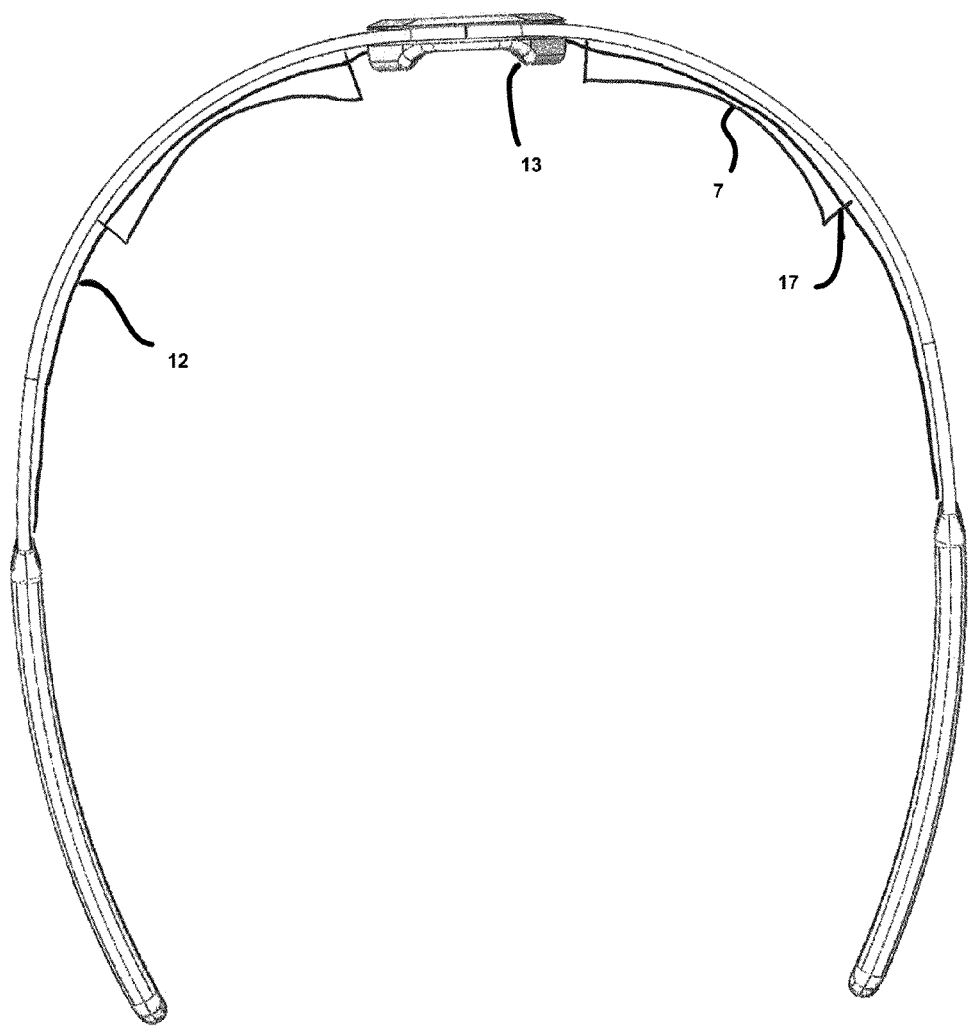
FIG. 3 is a top view of a sunglass frame assembled with optical rx insert carrier.

Referring to FIG. 1, the prescription carrier holds two lenses 1,2, by a bevel shown in FIG. 2, 3 with v cut. The v cut holds the lens 4 top and bottom and all around the exposed edge 5. The front surface 6 sits up against the backside of the sunglass frame FIG. 3, 7. The carrier FIG. 1, is held in place by three points 8, 9, 10. The middle point 8 is held in place by the tension 9, 10 create from force. The tightly mounted insert FIG. 1, is held in place without movement by the three touch points. The 11 and 12 holes are an option and can be added if the frame is equipped with hinges.

The carrier FIG. 1 can be made from several different methods, such as die cut from flat sheet material or from injection mold. The raw material for the thin sheet material can be made of polycarbonate, polyurethane which is available from GE Plastics. The supplier offers both injection material and sheet form.

The height of the material to be cut will range from one to two inches. The width can range from eleven inches to four inches. The thickness can vary from 0.010 to 0.060 inch. The carrier FIG. 1 can be molded to shape and not flexible or made from flat material and formed by pressure. In a preferred embodiment, the thin material has a thickness of 0.020 inch and conforms to the backside 12 of the sunglass frame. The nose piece will help secure the proper location of the carrier 8 area.

The carrier FIG. 1 will not stay in place with just being attached at the nose. The carrier FIG. 1 requires the outer left 9 and right 10 ends to be held in place to create tension.

Figure 4:
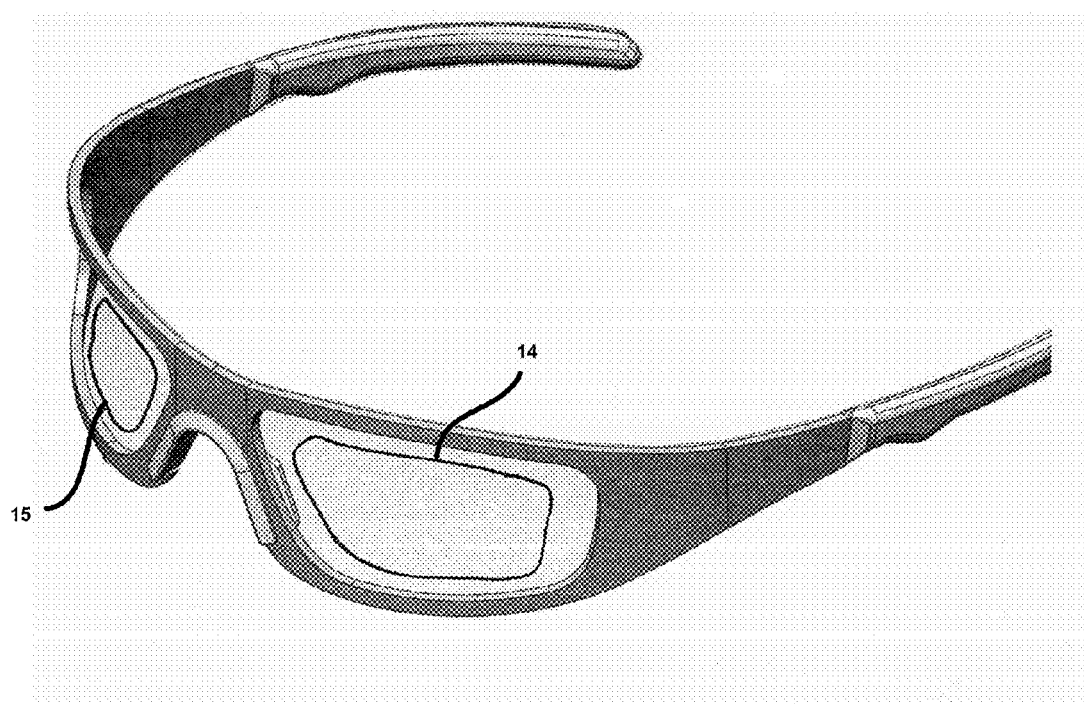
FIG. 4 is a perspective view of a sunglass frame assembled with RX lenses.

When the insert is assembled FIG. 1 into the FIG. 3, one cannot see much of the carrier when looking at front view FIG. 4. The only thing that shows is the outline 14, 15, of the edge of prescription hole 16 cut out.

The carrier FIG. 1 can be assembled with a prescription lens FIG. 2 that has a high minus or high plus and still have the wraparound sunglasses. The manufacture of the prescription cuts the v groove 3 to the front edge of the lens 16 to allow the carrier FIG. 1 to sit close to the FIG. 3, 17 sunglass frame.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. An optical insert carrier that may retain a left and right lens having at least two opening holes, the optical insert carrier may be attachable to a pair of sunglasses on a back side of a pair of sunglasses having a right and left lens, wherein the back side is the side of the sunglasses that faces the wearer, the optical insert carrier being made from thin sheet or molded material in the range of 0.010 to 0.060 inch thickness.

2. The optical insert carrier of claim 1, wherein the carrier is retained on the sunglasses at left and right ends and a middle section.

3. The optical insert carrier of claim 1, wherein the optical insert has substantially tapered pointed left and right ends.

4. The optical insert carrier of claim 1, wherein the optical insert carrier is used with a pair of sunglasses having a right and left lens; wherein the shape of the carrier substantially conforms to the backside of the sunglass frame.

* * * * *